May 9, 1967 A. ARLAUSKAS 3,318,049
VEHICLE CLOSURE
Filed Sept. 28, 1964 3 Sheets-Sheet 2

INVENTOR.
Alfonsas Arlauskas
BY
Herbert Furman
ATTORNEY

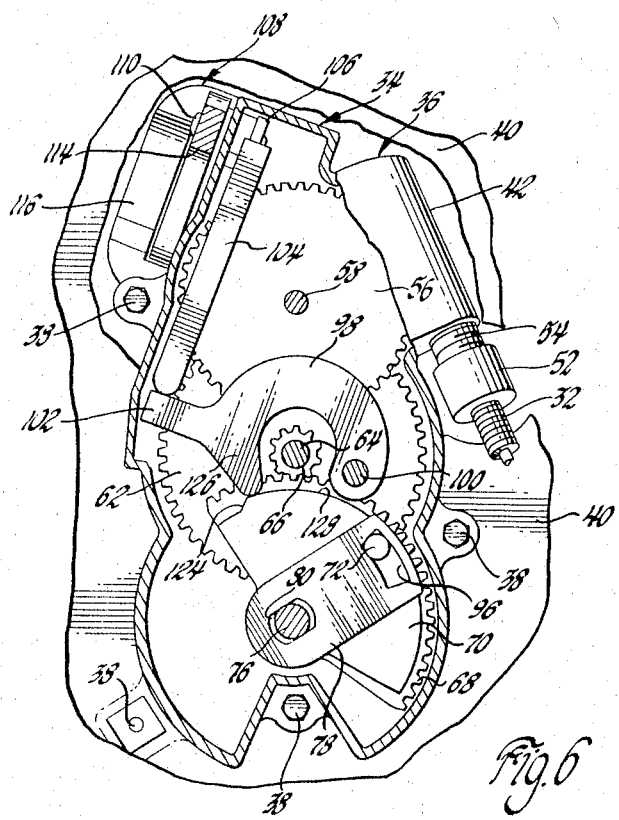

United States Patent Office 3,318,049
Patented May 9, 1967

3,318,049
VEHICLE CLOSURE
Alfonsas Arlauskas, Livonia, Mich., assignor to General Motors Corporation, Detroit, Mich., a corporation of Delaware
Filed Sept. 28, 1964, Ser. No. 399,513
4 Claims. (Cl. 49—280)

This invention relates to vehicle closures and more particularly to a drive means for both moving a vehicle closure member between open and closed positions and for latching and unlatching the closure member with respect to a body member.

The drive means of this invention is particularly adapted for use with station wagon bodies which include a swingable tailgate movable between open and closed positions with respect to the lower half of the rear opening of the station wagon and mounting a vertically movable tailgate window for opening and closing the upper half of the station wagon opening.

It is desirable that the tailgate be latched to the body in the closed position thereof and it is also desirable in certain instances that a power operated means be provided for moving the tailgate between open and closed positions when in the unlatched position thereof.

In the preferred embodiment of this invention, unitary power operated means operate a pair of drive assemblies, one for each side of the body, which are operable to release their respective latch means and also move the tailgate between open and closed positions. Each drive assembly generally includes a reduction gear unit which drives a cam member. A pair of actuating levers are adapted to be driven by the cam, with one lever being operatively connected to the cam through a lost motion connection and acting to move the tailgate between open and closed positions and the other actuating lever being operatively connected to the latch means to release the latch means prior to actuation of the first actuating lever and movement of the tailgate between open and closed positions.

The primary object of this invention is to provide an improved vehicle body closure. Another object of this invention is to provide an improved vehicle body closure having drive means for moving the closure between open and closed positions and for releasing closure latch means prior to movement of the closure. A further object of this invention is to provide an improved drive assembly interconnecting a closure member and a body member and operable to move the closure member between open and closed positions and actuate closure latch means latching the closure member to the body member.

These and other objects of the invention will be readily apparent from the following specification and drawings wherein:

FIGURE 6 is a view similar to FIGURE 4 but showing the drive assembly in a different position;

FIGURE 7 is a view taken generally along the plane indicated by line 7—7 of FIGURE 4;

FIGURE 8 is a view taken generally along the plane indicated by line 8—8 of FIGURE 2; and FIGURE 9 is a view taken generally along the plane indicated by line 9—9 of FIGURE 8.

Figure 1:
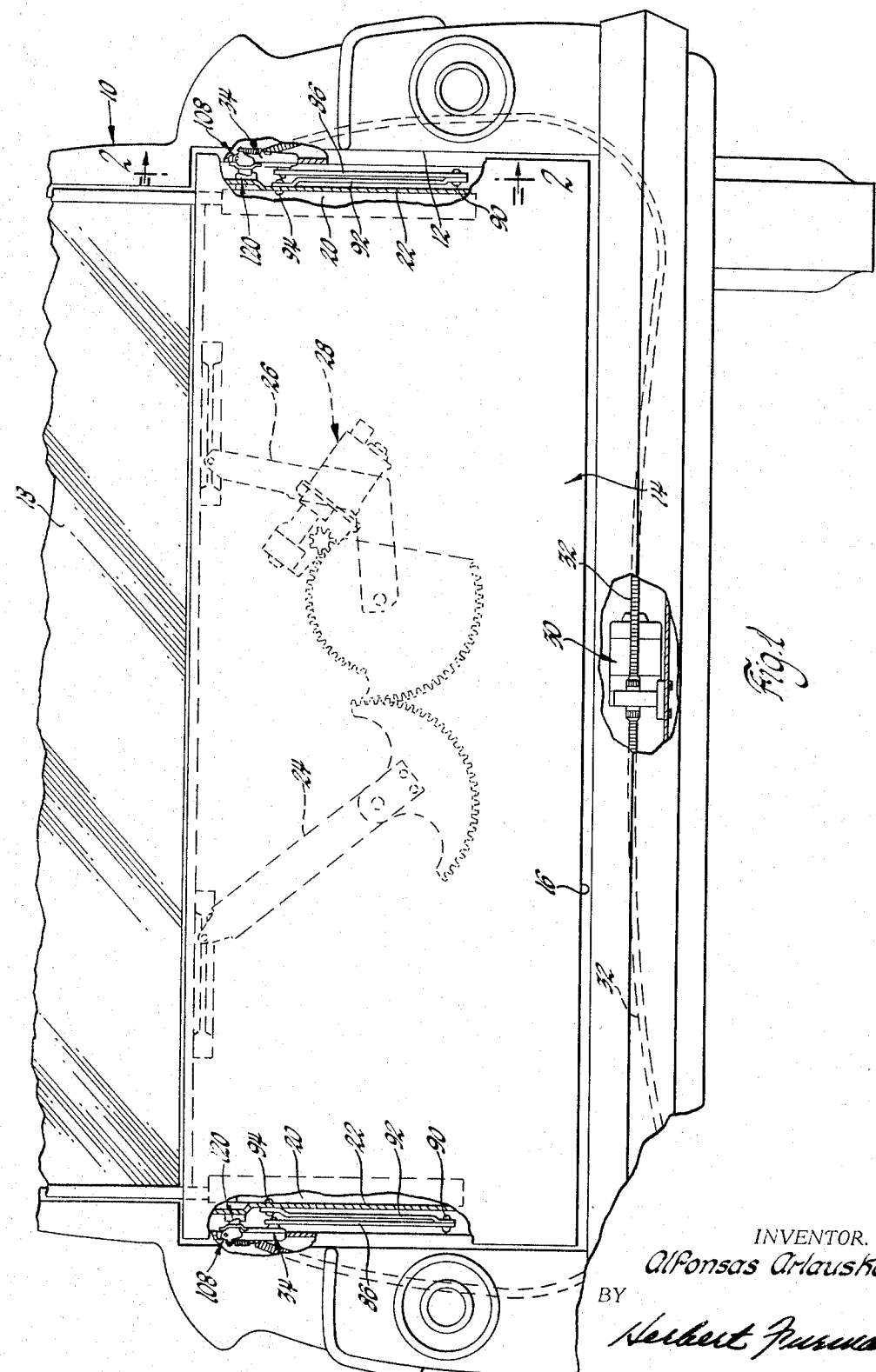
FIGURE 1 is a partially broken away partial rear elevational view of a vehicle body embodying a closure according to this invention.
Figure 2:
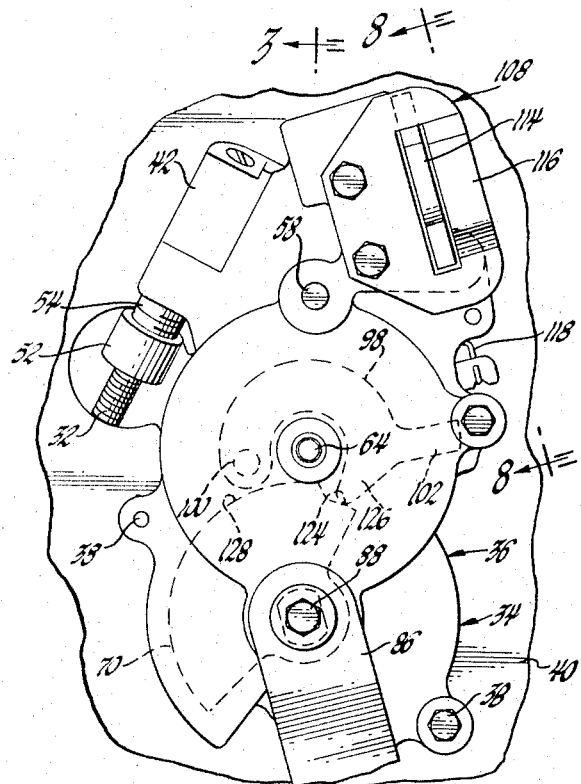
FIGURE 2 is a view taken generally along the plane indicated by line 2—2 of FIGURE 1.

Referring now particularly to FIGURE 1 of the drawings, a station wagon type of vehicle body 10 includes a rear opening 12, the lower half of whch is opened and closed by a tailgate 14 which is swingably mounted adjacent its lower edge 16 on the body 10 by suitable hinge means, not shown, for movement between a closed position, as shown, wherein the tailgate is generally vertically disposed and an open position, not shown, wherein the tailgate is generally horizontally disposed. The upper half of the opening 12 is opened and closed by a vertically movable tailgate window 18 which is mounted on the tailgate 14 for movement between a closed position, as shown, and an open position, not shown, wherein the window 18 is disposed within the tailgate 14 for movement therewith. Vertical movement of the window 18 with respect to the tailgate 14 is guided by a pair of guides 20 which are suitably mounted on the opposite jamb faces or walls 22 of the tailgate 14. The actuating means for the window 18 include a pair of intermeshing sector arms 24 and 26 which are suitably pivoted on the tailgate inner panel and are pivotally and slidably connected at their free ends to cam channels secured to the lower edge of the window 18. An electric motor and reduction gear unit 28 of conventional structure drives the arm 26 to move the window 18 between open and closed positions. Another conventional electric motor and reduction gear unit 30 is mounted on the body 10 below the lower edge 16 of the tailgate 14 and drives a pair of flexible cables 32, each of which operates a drive assembly designated generally 34 and located on opposite sides of the tailgate 14 for both moving the tailgate between open and closed positions and for actuating the tailgate latch means.

Each drive assembly 34 is of like construction, although of different hand, and accordingly only the right-hand one will be described.

As shown in FIGURES 2 through 9, the drive assembly 34 generally includes a housing designated generally 36 which is formed of two suitably shaped housing parts bolted together. Housing 36 is bolted at 38 to the pillar face or wall 40 of body 10. The housing includes an elongated chamber or boss 42 which rotatably mounts adjacent each end thereof a worm designated generally 44. The squared end of cable 32 is received within a like shaped bore in one end 50 of worm 44 to couple the worm and unit 30. An internally threaded cap 52 is secured to the cable sheath and threaded on an externally threaded portion 54 of the housing to hold the squared end of the cable 32 within the worm bore. Worm 44 meshes with a pinion 56 which is secured to a shaft 58 journaled in the housing. A pinion 60 is also secured to the shaft 58 and meshes with a pinion 62 which is secured to a shaft 64 journaled in the housing. Also secured to shaft 64 below pinion 56 is a pinion 66 which meshes with a sector 68. The sector 68 and a cam 70 are pinned together at 72, FIGURES 4 and 5, for rotation as a unit and are also rotatably journaled on a reduced diameter portion 74 of a shaft 76 which is journaled in the housing. An actuating lever 78 includes a double D shaped opening which receives a like shaped portion 80 of shaft 76 to secure the lever 78 to the shaft for rotation therewith and to also hold the sector 68 and cam 70 in engagement with an annular shoulder 82 of the shaft. Shaft 76 further includes a double D shaped end portion 84 which receives a like shaped opening in one end of a link 86 to operatively secure the link 86 to the shaft 76. A bolt and washer assembly 88 locate the link 86 axially of the shaft 76.

The other end of link 86 is pivoted at 90, FIGURE 1, to one end of a link 92, the other end of which is pivoted at 94 to the jamb face or wall 22 of the tailgate 14. The links 86 and 92 provide a foldable toggle linkage and upon swinging movement of the link 86, the toggle linkage will be folded and unfolded to thereby move the tailgate 14 between open and closed positions. The unfolded position of the toggle linkage also locates the tailgate 14 in its open position.

Figure 4:
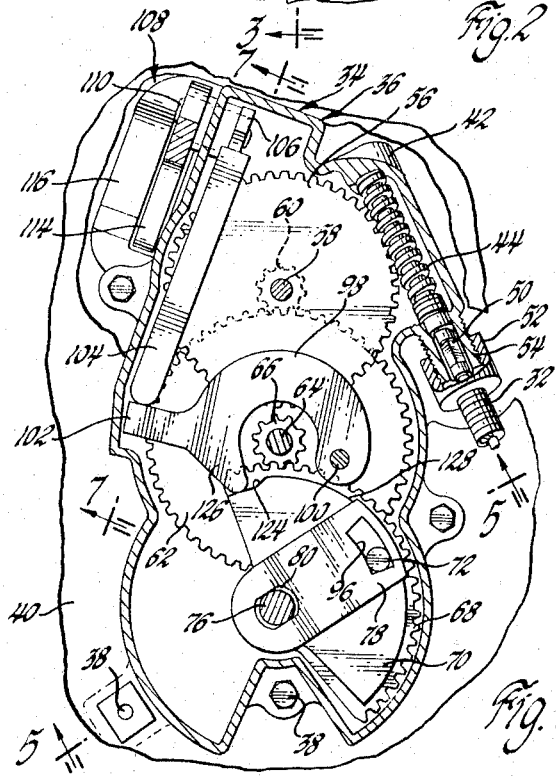
FIGURE 4 is a view taken generally along the plane indicated by line 4—4 of FIGURE 3.
Figure 3:
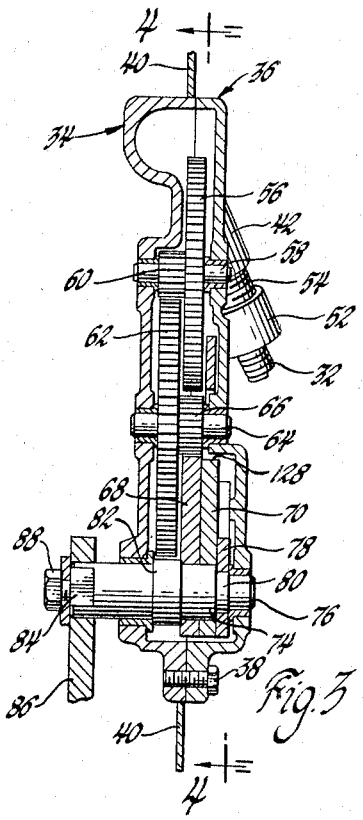
FIGURE 3 is a sectional view taken generally along the plane indicated by line 3—3 of FIGURE 2.
Figure 5:
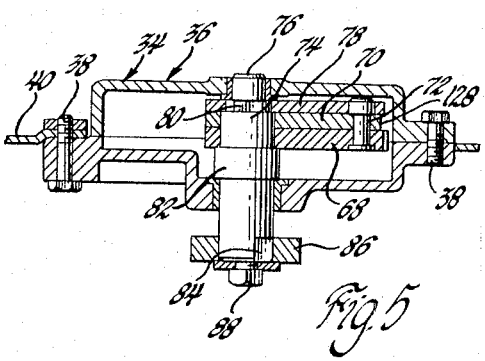
FIGURE 5 is a sectional view taken generally along the plane indicated by line 5—5 of FIGURE 4.

The lever 78 includes an arcuately shaped slot 96, FIGURE 4, which receives the head of the pin 72 and provides a lost motion connection between the lever 78 and the cam 70 and sector 68 for a purpose to be hereinafter described. A generally C-shaped actuating lever 98, FIGURES 4 and 5, is located to one side of the pinion 56 and above the pinion 66 and has one end thereof pivoted at 100 to the housing. The lever 98 includes an actuating arm or leg 102 which engages the lower end of a floating shiftable or intermittent link 104, FIGURES 4, 6, 7, the upper end of which engages an arm 106 of the latch means designated generally 108. The arm 106 includes a double D shaped opening which receives a like shaped portion of a shaft 110 rotatably journaled in the housing. The other end of the shaft 110 includes a double D shaped end portion which receives a like shaped opening in a latch bolt 114 to couple the bolt 114 to the shaft and to the arm 106. The bolt 114 swings within a slotted guide plate 116 to the housing. A coil tension spring 118 interconnects an arm of the bolt and an apertured tab of the housing to continually bias the bolt 114 toward latched position.

A striker plate or wedge 120 is suitably secured to the wall 22 of the tailgate 14. In the latched position of the bolt 114 and closed position of the tailgate, the bolt 114 engages a shoulder 122 of the striker plate to retain the tailgate in a closed latched position.

Assume now that the tailgate 14 is in a closed position as shown in the drawings and that the bolt 114 is in latching engagement with the shoulder 122 of plate 120 and it is desired to move the tailgate to an open position. The unit 30 is operated to drive the cable 32 in an appropriate direction so that the sector 68 and cam 70 will rotate in a counterclockwise direction, as viewed in FIGURE 4. The pin 72 will, of course, move within the slot 96 of lever 78 from the lower end thereof toward the upper end thereof so that the lever 78 and shaft 76 will remain stationary. After a slight initial movement of the cam and sector, a shoulder 124 of the cam will engage an actuating arm or leg 126 of the lever 98 to swing the lever 98 in a clockwise direction, as viewed in FIGURE 4, about its pivot 100 and in turn shift the link 104 upwardly from its position to FIGURE 4 to its position of FIGURE 6 and subsequently swing the arm 106 clockwise, as viewed in FIGURE 7, to rotate the shaft 110 in the same direction or counterclockwise, as viewed in FIGURE 8, to thereby move the bolt 114 out of latching engagement with the shoulder 122 of the striker 120. When the bolt 114 has moved to its unlatched position as shown in dotted lines in FIGURE 8, the sector and cam will have moved from their position as shown in FIGURE 4 to their position as shown in FIGURE 6 wherein it will be noted that the pin 72 is now located adjacent the upper end of the slot 96 of lever 78 and that the arm 126 of lever 98 has moved over the shoulder 124 and onto the outer periphery 128 of the cam so as to retain the bolt 114 in its unlatched position upon subsequent movement of the sector and cam relative to lever 98.

This subsequent movement of the sector and the cam will cause the pin 72 to move the arm 78 and the shaft 76 with the sector and cam to swing the link 86 and move the tailgate 14 to open position as previously described.

In order to move the tailgate 14 from its open position to its closed position, the direction of the unit 30 is reversed to swing the link 86 in the opposite direction and in turn rotate the sector 68 and cam 70 relative to the lever 78 as the pin 72 moves from the upper end of slot 96 to the lower end thereof as the arm 126 of lever 98 moves relative to the periphery 128 of the cam. Upon continued rotation of the sector and cam, the pin 72 will engage the lower end of the slot 96 to thereby start to move the tailgate 14 to its closed position. Prior to movement of the tailgate to its fully closed position, the leg 126 will ride down the shoulder 124 of cam 70 to thereby permit the spring 118 to return the bolt 114 to its latched position. As the tailgate moves to its fully closed position, the bolt will ride over the tapered surface 130 of the striker plate to thereby cam the bolt toward its unlatched position until the bolt engages the shoulder 122 to thereby retain the tailgate in its fully latched position.

Although no electrical control circuit has been shown, it will be understood, of course, that either the unit 30 will be provided with stall limiting means to stop movement of the unit when the tailgate 14 reaches its fully open or fully closed position, or the drive assembly will be provided with suitable limit switches to thereby also stop the unit 30. If desired, torque limiting clutches may be provided in the drive cables 32 so that should one drive cable or drive assembly get out of phase with the other, the parts will not become bent or broken.

Thus, this invention provides an improved vehicle closure.

What is claimed is:

1. In a vehicle body including a closure member movable between open and closed positions with respect to a body member, the combination comprising, latch means movable between latched and unlatched positions, resilient means biasing said latch means to latched position, a rotatable shaft journaled on one of said members, cam means rotatably mounted on said shaft and having an operating cam surface, means for rotating said cam means relative to said shaft, first means operatively connected to said latch means and engageable by said cam surface upon movement of said cam means for moving said latch means to unlatched position against the action of said resilient means, second means secured to said shaft for rotation therewith, third means operatively connecting said second means and said closure member for moving said closure member between open and closed positions, and lost motion means interconnecting said cam means and said second means to provide for successive movement of said first connecting means and said third connecting means.

2. The combination recited in claim 1 wherein said means for rotating said cam means includes a pinion rotatably mounted on said shaft and means operatively connecting said pinion to said cam means for simultaneous rotation as a unit.

3. The combination recited in claim 1 wherein said cam means includes a cam member rotatably mounted on said shaft and said means secured to said shaft includes a lever member, said lost motion means including a closed slot in one of said members and a projection on the other of the members engageable with the closed ends of the slot for connecting said cam member and said lever member.

4. The combination recited in claim 2 wherein said means for moving said cam means includes a pinion rotatably mounted on said shaft and a pin securing said cam means and pinion to each other for simultaneous rotation, said pin projecting beyond said cam means and being received within a closed end slot provided in said means secured to said shaft to provide the lost motion means interconnecting the cam means and the second means.

References Cited by the Examiner
UNITED STATES PATENTS

| | | | |
|---|---|---|---|
| 2,041,094 | 5/1936 | Simpson | 49—390 |
| 2,136,061 | 11/1938 | Steele | 49—300 |
| 2,174,599 | 10/1939 | Rhein | 49—300 |
| 3,081,078 | 3/1963 | Lohr | 49—280 X |
| 3,145,988 | 8/1964 | Colautti et al. | 49—280 |

REINALDO P. MACHADO, *Primary Examiner.*

HARRISON R. MOSELEY, *Examiner.*

J. K. BELL, *Assistant Examiner.*